May 14, 1957  P. A. VIOLA  2,791,832
GRASS TRIMMING SHEARS
Filed April 30, 1956
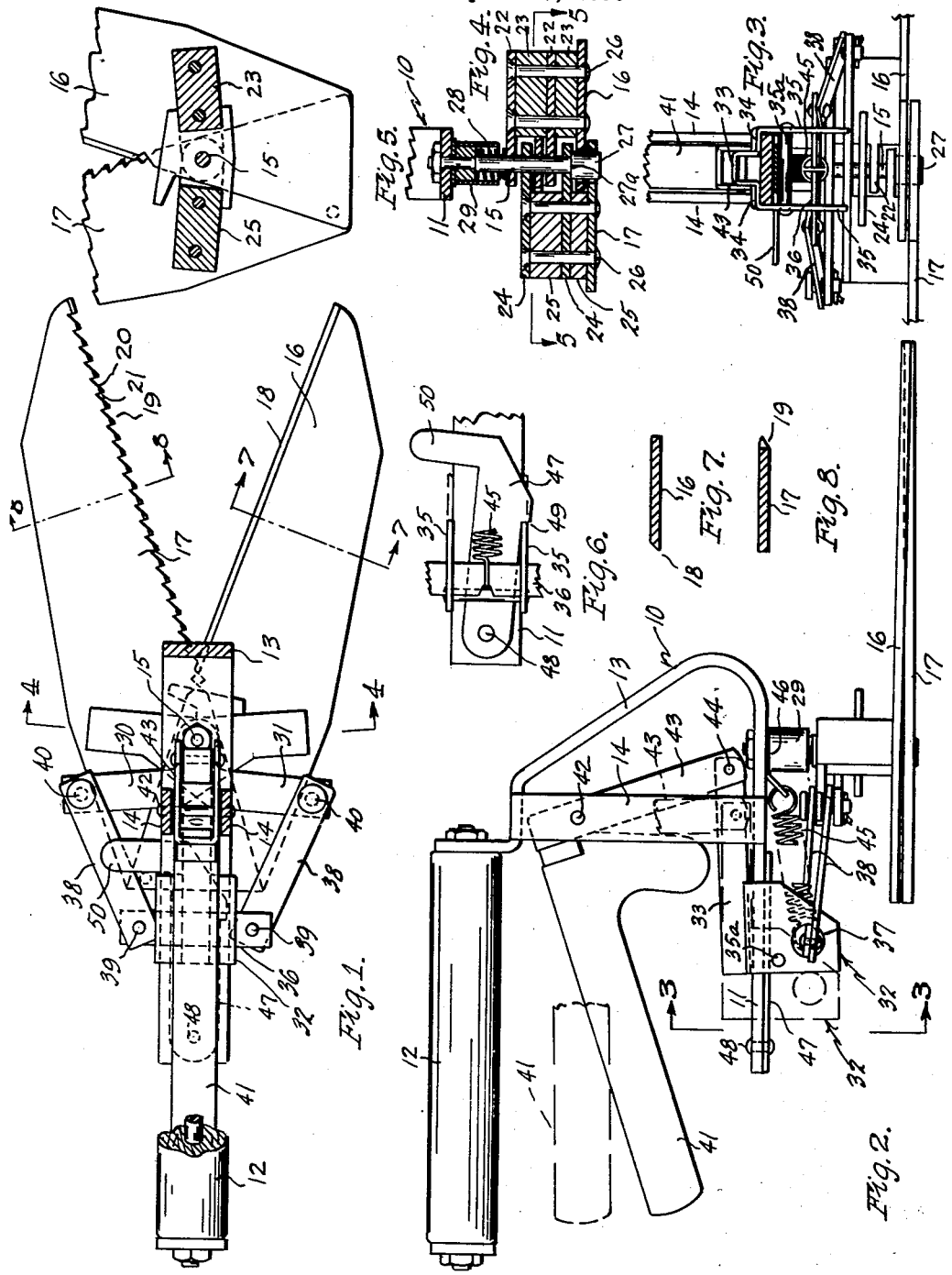
INVENTOR
Paul A. Viola
BY
Wooster & Davis
ATTORNEYS.

United States Patent Office 2,791,832
Patented May 14, 1957

2,791,832

GRASS TRIMMING SHEARS

Paul A. Viola, Bridgeport, Conn.

Application April 30, 1956, Serial No. 581,507

5 Claims. (Cl. 30—248)

This invention relates to trimming shears, particularly to shears for trimming grass and similar material, and has for an object to provide an improved and simplified construction for this type of shear, and one in which there is a hand-operated means for the blades so located as to be in a natural position for the operator's movements.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a top plan view of the shears with parts broken away to more clearly show the construction;

Fig. 2 is a side view thereof;

Fig. 3 is a detail transverse section substantially on line 3—3 of Fig. 2;

Fig. 4 is a transverse section substantially on line 4—4 of Fig. 1;

Fig. 5 is a detail section substantially on line 5—5 of Fig. 4;

Fig. 6 is a plan view of a catch mechanism;

Fig. 7 is a transverse section of the upper blade substantially on line 7—7 of Fig. 1, and Fig. 8 is a transverse section of the lower blade substantially on line 8—8 of Fig. 1.

This improved shear comprises a frame 10 which may be formed from a strip of flat metal of the desired width and thickness, and includes a lower bar 11 and an upper bar comprising a hand grip 12 connected by a forwardly inclined connecting portion 13. The frame may also include a pair of upright connecting bars 14 connecting the upper and lower portions of the frame on opposite sides thereof. Pivoted to the lower bar 11 at the forward portion thereof and by any suitable means, such as the pivot pin 15, is a pair of superposed blades 16 and 17 each having suitable cutting edges 18 and 19 respectively for the shearing operation. The lower blade preferably has a notched or toothed edge 19 with the forward sides preferably inclined as shown at 20, and the rear sides 21 at an acute angle to grip and hold the material being cut and prevent it from sliding forwardly on the blade during the shearing action. The upper blade may have a straight shearing edge 18 cooperating with this toothed lower blade.

The two blades are pivotally mounted on pivot 15 by any suitable means, that shown comprising two plates 22 spaced above the upper blade by a pair of spacing blocks 23 and these plates and the blade being pivoted on pin 15. Similarly the lower blade 16 is pivoted on the pin 15 and has two additional vertically spaced plates 24 also pivoted on this pin and separated by the spacing blocks 25. The plates and blocks may be integral in one piece or riveted together and to the blades by the rivets 26.

The plates and blades are overlapped or interlaced, as shown in Figs. 3 and 4, to provide a more substantial pivotal support for the blades and securely hold them against lateral rocking movement. The pin 15 has an enlarged head 27 on which the two blades are pivoted and thus provides a top shoulder 27a engaging the lower side of plate 24. A spring 28 embraces this pin and presses down on the upper plate 22 to thus provide a spring pressure between the two blades and maintain the proper shearing action between them, and automatically compensate for wear between the blades. It also maintains the proper pressure between the blades for a uniform shearing action. The spring may be enclosed and protected by a sleeve 29 secured to the under side of the lower bar 11 of the frame.

Extending laterally from the blades, in the arrangement shown from one of the plates 22 and 24, are lever arms 30 and 31, which are thus secured one to each of the blades, and mounted on the lower bar 11 of the frame is an operating slide 32 preferably of substantially inverted U shape with the top portion of a smaller inverted U section 33 on top of the bar 11, and lateral portions 34 slidable on top of the bar with the sides or legs of the U 35 straddling the bar 11 and depending from the opposite sides thereof. These legs carry a transverse bar 36 extending between them and through openings 37 in the legs, and the opposite ends of this bar are connected by the links 38 to the arms 30 and 31, these links being pivoted at one end 39 to the bar 36, and at their opposite ends 40 to the arms 30 and 31. Pivotally mounted within the frame below the hand grip 12 is a finger grip or operating lever 41 pivotally mounted between the upright members 14 of the frame 10 at 42, and at its forward end it is provided with a pair of laterally spaced arms 43 pivotally connected at their lower ends at 44 to the forward end of the reduced portion 33 of the slide 32, these arms straddling the portion 33 as shown. A coil spring 45 is connected to the transverse bar 36 between the arms 35 of the slide, and at its forward end is connected to a washer 46 secured on the pivot pin 15.

There is also mounted on the lower bar 11 of the frame a releasable catch 47 comprising a flat strip of metal pivoted at 48 to the bar at the under side thereof between the legs 35 of the slide, and having a shoulder 49 at one edge adapted to engage the forward edge of one of the legs 35 of the slide when the slide is in its rearward position, as indicated in broken lines in Fig. 2, and full lines in Fig. 6. In this position the blades are in the closed position and they may thus be retained in this position when not in use. The catch 47 includes a laterally extending finger piece 50 projecting from the opposite side of the bar 11, by means of which this catch may be shifted to release or secure the slide 32.

In operation, with the catch 47 swung to remove the shoulder 49 from in front of the leg 35 of the slide, the spring 45 tends to shift the slide 32 forwardly and swing the blades to the open position of Fig. 1. In this position the lever or finger grip 41 is in the lower or full line position of Fig. 2. The operator, by gripping the upper or hand piece 12 in the palm of his hand, and with his fingers under the finger grip 41, may raise this finger grip with a free natural action, as indicated by the broken lines in Fig. 2, which through the connections 43 and pivot 44 will shift the slide 32 to the left on the bar 11 against action of the spring 45, and this shifting movement of the slide acting through the links 38 and the arms 30 and 31 will swing the shear blades on their pivot 15 to the closed position for the shearing operation. This action tensions the spring 45, and then after release of pressure on the lever or finger grip 41, this spring shifts the slide 32 forwardly to the full line position of Fig. 2, thus opening the shear blades preparatory for the next shearing operation. After use of the shears the lever 41 may be lifted to close the blades, shifting the slide 32 to the left or broken line position of Fig. 2, and then the catch 47 may be shifted to bring the shoulder 49 across the front edge of one of the legs 35 of the slide and thus retain the blades in the closed position until it is desired to again use the shears.

This arrangement of the handle 12 and the finger grip or operating lever 41 in the arrangement shown positions the hand in a natural position for operating the blades, and the slide 32 and its operative connections to the blades and the finger grip 41 provide a very effective action for the blades, providing positive action for the blades in the shearing operation, and the spring 45 automatically shifts them to the open position on release of pressure on the lever 41, preparatory to the next shearing action.

Having thus set forth the nature of my invention, I claim:

1. Trimming shears comprising an open frame having a lower bar and an upper bar spaced above the lower bar forming a hand grip, pivot means depending from the lower bar, a pair of overlapping shearing blades pivotally mounted on said pivot means, an operating member mounted to slide longitudinally on the lower bar, link connections from the operating member to the respective blades to swing them on their pivots, an operating lever pivoted in the frame including a finger grip below the hand grip, an operative connection from the lever to the operating member to slide it along the bar to operate the blades in one direction, and spring means to operate the blades in the opposite direction.

2. Trimming shears comprising a frame including a lower bar, pivot means on said bar, a pair of shear blades pivotally mounted on said pivot means, a slide mounted to move longitudinally on the bar, link connections from the slide to the respective blades for operating them, a hand grip on the frame spaced above said bar, an operating lever pivotally mounted in the frame including a finger grip below the hand grip, an operative connection from the lever to the slide to shift the slide along the bar and operate the blades in one direction, and spring means to operate the blades in the opposite direction.

3. A trimming shear according to claim 2 in which there is a releasable catch on the bar to retain the slide in its advanced position with the blades closed.

4. Trimming shears comprising a frame including a lower bar and an upright portion at one end thereof, pivot means including a pin depending from the bar and provided with a stop means adjacent its lower end, a pair of shear blades pivotally mounted one above the other on said pin between the stop means and the bar, a spring on the pin pressing downwardly on the upper blade, a hand grip on the upright portion of the frame spaced above the bar, an operating lever pivotally mounted in the frame including a finger grip below the hand grip, an operative connection from the lever to the blades for operating them in one direction including a moveable slide mounted on the bar and connections from the slide to the blades, and spring means to operate the blades in the opposite direction.

5. Trimming shears comprising a frame including a lower bar, pivot means on said bar, a pair of shear blades pivotally mounted on said pivot means, a lever arm connected to each blade, a slide mounted to move longitudinally on the bar, link connections from the slide to the respective arms for operating the blades about their pivots, a hand grip on the frame spaced above said bar, an operative lever pivotally mounted in the frame including a finger grip under the hand grip, an operative connection from the lever to the slide to shift the slide on the bar and operate the blades in one direction, and spring means for operating the blades in the opposite direction.

References Cited in the file of this patent

UNITED STATES PATENTS

| | | |
|---|---|---|
| 1,931,045 | Vosbikian et al. | Oct. 17, 1933 |
| 2,306,506 | Simonsen et al. | Dec. 29, 1942 |